(No Model.)
G. A. COOKE.
PHOTOGRAPHING INSTRUMENT.
No. 401,330. Patented Apr. 16, 1889.
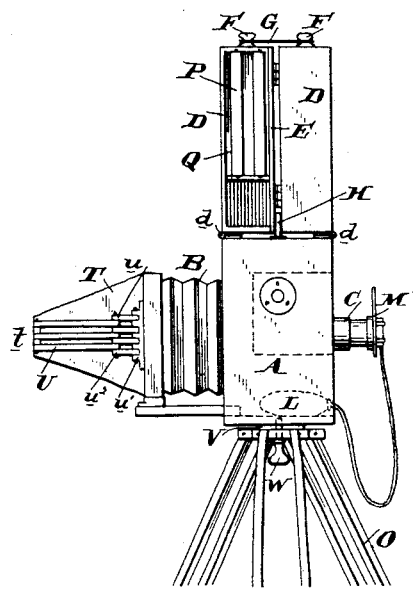
FIG. 1
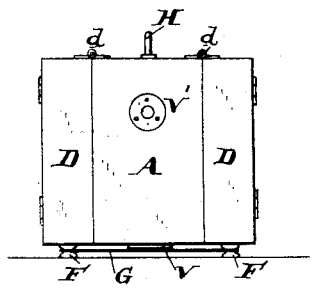
FIG. 2
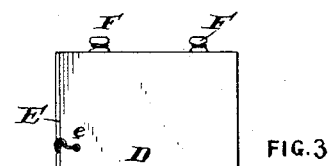
FIG. 3
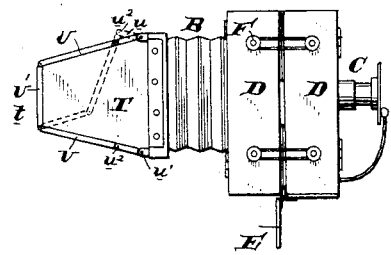
FIG. 4
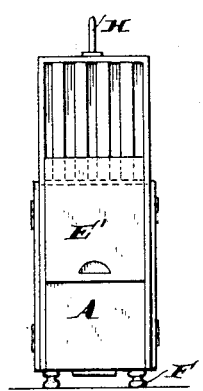
FIG. 5
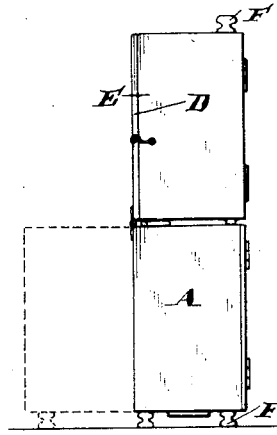
FIG. 6
Attest:
Inventor:
George A. Cooke

UNITED STATES PATENT OFFICE.

GEORGE A. COOKE, OF PHILADELPHIA, PENNSYLVANIA.

PHOTOGRAPHING-INSTRUMENT.

SPECIFICATION forming part of Letters Patent No. 401,330, dated April 16, 1889.

Application filed March 29, 1888. Serial No. 268,837. (No model.)

*To all whom it may concern:*

Be it known that I, GEORGE A. COOKE, of the city and county of Philadelphia, and State of Pennsylvania, have invented an Improvement in Photographing-Instruments, of which the following is a specification.

My invention has reference to photographing-instruments; and it consists of certain improvements which are fully set forth in the following specification, and shown in the drawings which accompany it.

More specifically, my invention relates to portable instruments for photographing in which a complete photographer's outfit may be compactly arranged in small space. In the devices heretofore employed it has been usual to pack the camera in a case, from which it must be removed for use, and great difficulty has been met with in satisfactorily arranging for quick use the photographing or sensitized plates. Where photographs are to be taken quickly and frequently, it is necessary to have an instrument which can be readily put into position for use and in which all the articles necessary for the photographing are conveniently at hand. Photographers are well aware that in getting a satisfactory focus or sight it not unfrequently happens that the camera has to be moved about, and when the plates are in the case from which the camera has been removed it requires the operator to run back after such plates and case. This is annoying and inconvenient, and induces a great loss of time, particularly felt where the photographs are made between stops in the train upon which the tourist photographer may be traveling. Another difficulty is with the darkening-screen used in focusing. In place of using the loose cloth, I arrange a convenient collapsible shade or screen permanently on the camera. By my arrangement of apparatus I obviate all of the existing objections in the apparatus now found in the market. To accomplish these objects my invention is intended, and to this end I employ the apparatus shown in the drawings, in which—

Figure 1 is a side elevation of a photographing-instrument embodying the principles of my invention arranged in position for photographing. Fig. 2 is a side elevation of the same when closed up and ready to be carried. Fig. 3 is a front elevation of the instrument opened for use. Fig. 4 is a plan view of the same looking down upon the top of the instrument, as shown in Fig. 1; and Figs. 5 and 6 are side elevations of instruments embodying modifications of my invention.

The main feature of my invention is the arrangement in one complete structure of the camera and the plate-holders, whereby the two cannot be separated and are at all times in the most convenient relative positions for use. The case, forming part of or holding the camera and forming the receptacle for the plate-holders, should be such that it can be conveniently carried, dispensing with the usual heavy and additional independent case. I prefer to make the case with hinged parts, as it shortens the length of the case and makes it more convenient for handling.

A is the main box or case, into which the camera B is secured. C is the object-lens, and is removable from the camera B.

D are two additional box portions hinged to the top of the box A at *d*, and forming, when closed, the covers of the box portion A, holding the camera. The box portions or covers D are provided with compartments P, for the reception of the photographing-plate holders Q, so that when the apparatus is opened for use the plates are conveniently at hand, and may without delay be inserted in the camera, removed and replaced by others, and a large number of views may thus be taken in a very short period of time.

E are doors upon the sides of the box portions or covers D, by which these compartments may be opened or closed.

F are knobs or feet upon these box portions D, over which rubber bands G may be passed to hold the box portions D open when photographing.

When the apparatus is closed up, these knobs F act as feet, upon which it may rest, as shown in Fig. 2, and the bands G hold the parts D closed; but of course these are mere details of construction, which, while they add materially to the general advantage or effect, are not limitations of the invention, and any other means may be employed to keep the box portions or lids D open.

H is a handle, which may be placed upon the top of the main box A for the purpose of carrying the apparatus, and I prefer to so locate this handle upon the box A that it will fit in between the box portions or covers D when they are opened, as shown in Fig. 1.

S is the camera-frame, which I prefer to have of dimensions slightly smaller than those of the box A, to allow a compartment, K, to be made in the space between them, into which, when the apparatus is to be closed, the shutter M, removed from the lens C, may be placed. This shutter M is the ordinary shutter employed for taking instantaneous views, having the rubber tube and bulb L. The lens C is preferably secured, as usual, to a board, R, within the frame S of the camera, which may be removed and reversed, so that the lens may be turned into the camera when the apparatus is to be closed up. By means of a lock, $r$, the board R may be held in place.

J is a pocket-compartment, which I prefer to construct within the box A to hold the different sight-stops.

T is a collapsible shade for the eyes for focusing the lens, and takes the place of the loose head covering or cloth ordinarily used. This shade consists of the jointed pieces U $u$, hinged at $u'$ to the frame of the bellows portion of the camera on each side, and pieces U' may be used hinged to the ends of the pieces U to keep the shade open when in use. The particular arrangement of these jointed pieces U $u$ is not important; but I prefer to employ a number of jointed pieces on each side, as is shown in Fig. 1, as I thereby obtain greater firmness and allow the frame to be more easily folded. Over the frame formed by these pieces U, $u$, and U' a tubular covering of any suitable material, T, is stretched, through the open end of which the sight is taken. When the apparatus is to be closed up, these jointed pieces U $u$ are bent in on the hinge-points $u^2$ and $u'$, as is shown in dotted lines in Fig. 4, and the entire shade T collapses.

Upon the bottom of the frame A, I prefer to place a plate, V, by which the apparatus may be secured to a tripod or other stand, O, by means of a screw, W, and, if desired, a similar plate, V', may be placed upon the side of the box A, so that the camera may also be secured upon its side for use in taking pictures of greatest vertical length.

It is apparent that my invention presents an apparatus which contains in itself all the necessary paraphernalia of a photographer's outfit.

The box when closed presents the appearance shown in Fig. 2. When it is desired to use the instrument, the box, by means of the plate V and screw W, is secured to the stand O. The box portions or covers D are opened upon the box A and held in position by means of a rubber band, G. The plate R is reversed, and the lens C thus placed in position. The bellows portion of the camera is drawn out and the focusing-screen T opened up. After focusing proper sight-stop is taken from the pocket J and placed upon the lens, and the shutter M is taken from the compartments K and put in place. A plate-holder, Q, is taken from one of the boxes or covers D and inserted in the camera, and the apparatus is in condition for use. This is the construction which I prefer to use; but I do not limit myself to the mere details of it, as it is apparent that they may be varied in many ways without departing from the principles of my invention. The box A may be considered as part of the camera.

Two modifications are shown in Figs. 5 and 6. In the former the case A is extended upward to form a compartment for the photographing-plates above the camera, and the movable box portions D are not used. In this construction sliding door E' may be used to open and close the compartment in which the plates are kept.

In Fig. 6 is shown a modification in which a single compartment D is used in place of the two box portions D, hinged at $d$ to the box A. In these modifications ordinary covers would be used to protect the ends of the compartments A when no compartments D closed down.

While I prefer the construction herein set out, as practice has dictated it to be excellently adapted to the objects in view, I do not limit myself to the details, as they may be modified in various ways without departing from the spirit of the invention.

Having now described my invention, what I claim as new, and desire to secure by Letters Patent, is—

1. A carrying-case for a camera, consisting of an inclosing-frame in which the camera is secured, in combination with removable door or cover upon opposite sides thereof corresponding to the front and rear of the camera, so as to expose both ends of the camera without removing it from the inclosing-frame, a plate-holding compartment carried by one of said doors or covers, and a handle for carrying the case.

2. A portable photographic apparatus consisting of a main case in which the camera is formed or secured, having means of attachment for use to a tripod or other support, in combination with an auxiliary box or case to contain the photographic sensitized plates or holders hinged at its upper edge to said main case and capable of being folded upon the top of the main case, exposing the focusing-plate of the camera according as to whether the camera is to be carried or used.

3. In a portable photographic apparatus, a main case provided with means of attachment for use to a tripod or other support and having compartments within it to receive the photographing-shutter and stop-sights, in combination with a camera secured in said main case, and a movable compartment for the plates or holders attached to said main case.

4. In a portable photographic apparatus, the combination of a case or box-frame independent of the camera and having means of support upon a tripod, two covers or doors for opposite sides of said frame to expose the front and rear of the camera, a collapsible camera secured within said box-frame, and a collapsible focusing shade or screen secured to the rear of the camera.

5. In a portable photographic apparatus, a main case provided with means of attachment to a tripod or other stand, in combination with a camera secured therein, having a collapsible focusing shade or screen, consisting of the double-jointed side pieces, U u, and cross-pieces U', and the textile or flexible covering T.

6. In a portable photographic apparatus, the main case A, having doors or covers and means of attachment to a tripod or other support for use, in combination with a camera, B, formed or secured within said main case A, having a lens, C, secured to the removable and reversible board R, whereby said lens C may be turned into the camera when it is not in use.

7. In a portable photographic apparatus, the main case A, having doors or covers and means of attachment to a tripod or other support for use, in combination with a camera, B, formed or secured within said main case A, having a lens, C, secured to the removable and reversible board R, whereby said lens C may be turned into the camera when it is not in use, and compartments K and J within said main frame A.

8. In a portable photographic apparatus, the main case A, having doors or covers and means of attachment to a tripod or other support for use, in combination with a camera, B, formed or secured within said main case A, having a lens, C, secured to the removable and reversible board R, whereby said lens C may be turned into the camera when it is not in use, compartments K and J within said main frame A, and movable compartments for the photographing plate-holder formed on the door or covers of the case A.

9. The combination of a box-frame having its opposite ends open, a collapsible camera secured within said frame and having its lens at one of the open ends and its focusing-plate at the other open end and extensible from said frame, and a plate-holding compartment secured to said frame and arranged above it when photographing and having no communication with the camera proper.

10. The combination of a box-frame having its opposite ends open, a collapsible camera secured within said frame and having its lens at one of the open ends and its focusing-plate at the other open end, a removable plate holding said lens, so that it may be turned into the camera when not in use, a plate-holding compartment secured to said frame and arranged above it when photographing, and a handle for carrying said apparatus arranged at its top.

11. A camera-case consisting of a frame independent of the camera proper, provided with means for attachment to a tripod and having two of its diametrically-opposite sides open, in combination with two doors or lids adapted to close said open ends or sides, and a carrying-handle secured to the upper part of the case between the doors or lids and on the opposite side with reference to the means for attachment to the tripod.

12. A combined camera and plate-holder case consisting of the camera-compartment A, having a handle, in combination with the two plate-holder compartments D D, having doors E and hinged to the compartment A.

13. A combined camera and plate-holder case consisting of the camera-compartment A, having a handle and plate V, in combination with the two plate-holder compartments D D, having doors E and hinged to the compartment A and provided with feet F F, and a rubber band, G, to snap over said feet to hold the case open or closed.

14. The combination of a box-frame open at opposite ends and provided on two of its sides at right angles to each other with plates V V', for securing it to a tripod, doors or covers for said open ends of the box-frame, and a collapsible camera having a rectangular focusing-plate longer in one direction than the other and secured within said box-frame, so that its sides or edges are parallel with the box-frame sides.

15. A camera made collapsible having an independent plate-holding compartment secured to it when in use, but above and forward of the plate-holding part of the camera, but having no communication with the camera proper, whereby plates may be taken from the compartment by hand and inserted in place in the camera, and in which the focusing plate or glass is exposed when the apparatus is in its normal position and condition for photographing, and inclosing-covers on front and back to inclose and protect the camera when being transported.

In testimony of which invention I hereunto set my hand.

GEORGE A. COOKE.

Witnesses:
R. M. HUNTER,
ERNEST HOWARD HUNTER.